United States Patent
Bachmeyer et al.

(10) Patent No.: US 6,715,746 B2
(45) Date of Patent: Apr. 6, 2004

(54) VIBRATION ISOLATION DEVICE WITH LOAD DEPENDENT STIFFNESS

(75) Inventors: Paul J. Bachmeyer, Apex, NC (US); Michael R. Blewett, Stillman Valley, IL (US); Marvin D. Ohme, Rockford, IL (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/910,384

(22) Filed: Jul. 20, 2001

(65) Prior Publication Data

US 2002/0079630 A1 Jun. 27, 2002

Related U.S. Application Data

(60) Provisional application No. 60/219,891, filed on Jul. 21, 2000.

(51) Int. Cl.[7] .............................. B60G 11/22; F16F 1/40
(52) U.S. Cl. ................ 267/294; 267/371; 267/116; 267/140; 248/613; 248/634; 188/371
(58) Field of Search .............................. 188/371, 378, 188/379, 380; 267/292, 293, 294, 66, 116, 139, 140; 248/560, 200, 610, 613, 634

(56) References Cited

U.S. PATENT DOCUMENTS

| | | | |
|---|---|---|---|
| 3,301,335 A | 1/1967 | Snelling | |
| 3,653,468 A | 4/1972 | Marshall | ............ 188/1 C |
| 3,718,304 A | 2/1973 | Schulz et al. | |
| 3,759,351 A * | 9/1973 | Purple | ............ 188/376 |
| 3,769,851 A | 11/1973 | Edme et al. | |
| 3,794,277 A | 2/1974 | Smedley et al. | |
| 3,856,242 A * | 12/1974 | Cook | ............ 248/548 |
| 3,866,367 A * | 2/1975 | Strizki | ............ 248/694 |
| 3,968,862 A | 7/1976 | Gorges et al. | ............ 188/1 C |
| 4,006,647 A | 2/1977 | Oonuma et al. | ............ 74/492 |
| 4,059,304 A * | 11/1977 | Yamanaka | ............ 188/374 |
| 4,078,636 A * | 3/1978 | Yamanaka | ............ 180/271 |
| 4,204,659 A | 5/1980 | Phillips et al. | ............ 248/562 |
| 4,361,212 A * | 11/1982 | Bolang et al. | ............ 188/377 |
| 4,459,261 A * | 7/1984 | Kolodzey et al. | ............ 267/177 |
| 4,537,374 A | 8/1985 | Barnoin et al. | ............ 244/102 R |
| 4,815,678 A | 3/1989 | Gawne | |
| 4,823,923 A | 4/1989 | Moyer | ............ 188/376 |
| 4,968,010 A * | 11/1990 | Odobasic | ............ 267/140.11 |
| 5,065,959 A | 11/1991 | Bhatia et al. | ............ 244/54 |
| 5,197,692 A | 3/1993 | Jones et al. | ............ 244/54 |
| 5,271,314 A * | 12/1993 | Derrien | ............ 188/371 |
| 5,275,357 A * | 1/1994 | Seelen et al. | ............ 244/54 |
| 5,303,880 A * | 4/1994 | Cencula et al. | ............ 244/54 |
| 5,320,307 A * | 6/1994 | Spofford et al. | ............ 244/54 |
| 5,332,071 A | 7/1994 | Duncan | ............ 188/371 |
| 5,351,930 A | 10/1994 | Gwinn et al. | ............ 248/557 |
| 5,538,117 A | 7/1996 | Bouchez | ............ 188/371 |
| 5,699,984 A | 12/1997 | Pinault | ............ 244/122 R |
| 5,762,295 A | 6/1998 | McGuire et al. | ............ 244/54 |
| 5,788,372 A | 8/1998 | Jones et al. | ............ 267/136 |
| 5,860,623 A | 1/1999 | Dunstan et al. | ............ 255/54 |
| 5,876,023 A | 3/1999 | Hain et al. | ............ 267/141.4 |
| 5,921,500 A | 7/1999 | Ellis et al. | ............ 244/54 |
| 5,927,644 A | 7/1999 | Ellis et al. | ............ 244/54 |
| 5,984,233 A | 11/1999 | Snyder, Jr. et al. | ............ 244/119 |

FOREIGN PATENT DOCUMENTS

| | | |
|---|---|---|
| EP | 840033 | 6/1998 |
| JP | 61-266841 A | 11/1986 |

\* cited by examiner

*Primary Examiner*—Christopher P. Schwartz
*Assistant Examiner*—Devon Kramer
(74) *Attorney, Agent, or Firm*—Edward F. Murphy, III

(57) ABSTRACT

A vibration isolation device is disclosed. More specifically the vibration isolation device of the present invention comprises a fuse for decreasing the mount stiffness when loads above a threshold load value are applied to the device. The fuse for decreasing the mount stiffness comprises a shear pin with shear locations that comprise annular grooves with semielliptical cross sections.

5 Claims, 5 Drawing Sheets

VIBRATION ISOLATION DEVICE WITH LOAD DEPENDENT STIFFNESS

CROSS REFERENCE

The present application claims the benefit of U.S. Provisional Patent Application No. 60/219,891 filed Jul. 21, 2000.

FIELD OF THE INVENTION

The invention relates to a vibration isolation device and more specifically the invention relates to a vibration isolation device for an aircraft engine oil tank wherein the isolation device includes means for decreasing the mount stiffness when loads above a threshold load are experienced.

BACKGROUND OF THE INVENTION

Aircraft jet engines include a turbine fan or blower that draws ambient air into the engine for compression and combustion by the engine. The turbine fan or blower is shrouded by a casing. An engine oil tank is attached to the engine fan casing by a rigid bracket and pin connection that is fixed to the casing and the bracket is in turn made integral with a vibration isolator that is fixed to the exterior of the oil tank housing. The conventional oil tank vibration isolator is relatively rigid with substantially constant stiffness. As a result, the isolator operates in a manner similar to a hard mount. In such conventional aircraft engine isolation systems, during normal loading and operating conditions the conventional isolator limits the transmission of engine vibratory loads to the oil tank. Typically, such loads are high frequency loads, having relatively low amplitude or magnitude. During an engine blade out event or during any period when the load applied to the isolator is applied at a frequency lower than normal operating speeds and is of an amplitude or magnitude above the normal operating load condition, the rigid mount may be unable to limit transmission of such large applied loads to the oil tank and as a result, the larger than typical loads may damage the oil tank.

The foregoing illustrates limitations known to exist in present isolators. Thus, it is apparent that it would be advantageous to provide an alternative oil tank isolator that is designed to absorb engine loads under typical engine operating conditions and also larger vibratory loads that are experienced during an engine fan blade out event for example. Accordingly, a suitable alternative isolator is provided including features more fully disclosed hereinafter.

SUMMARY OF THE INVENTION

In one aspect of the present invention this is accomplished by providing a vibration isolation device located between a first member and a second member, the isolation device having a first isolation device stiffness supplied when loads applied to the isolation device are below a predetermined threshold load, the isolation device further comprising a second isolation device stiffness supplied when the load applied to the isolation device is at least equal to the threshold load, the vibration isolation device further comprising a fuse means for altering the mount stiffness to the second isolation device stiffness when the threshold load is applied to the device, the isolation device being movable relative to the first member in a plurality of directions after the fuse is actuated.

In the vibration isolation device of the present invention the means for decreasing the device stiffness is a shear pin that includes at least one shear location along the length of the pin. The present invention comprises two shear locations and both of the shear locations comprise an annular groove with a semielliptical cross section.

The vibration isolation device of the present invention includes a housing defining a chamber with a spring member located in the housing. The spring member comprises a first plate member and a second plate member that define an inner chamber, a first shim member and a second shim member and a first resilient member joining the first shim and first plate and a second resilient member joining the second shim and second plate.

The foregoing and other aspects will become apparent from the following detailed description of the isolation device of the present invention when considered in conjunction with the accompanying drawing figures.

DETAILED DESCRIPTION OF THE PREFERRED EMBODIMENTS

Figure 1:
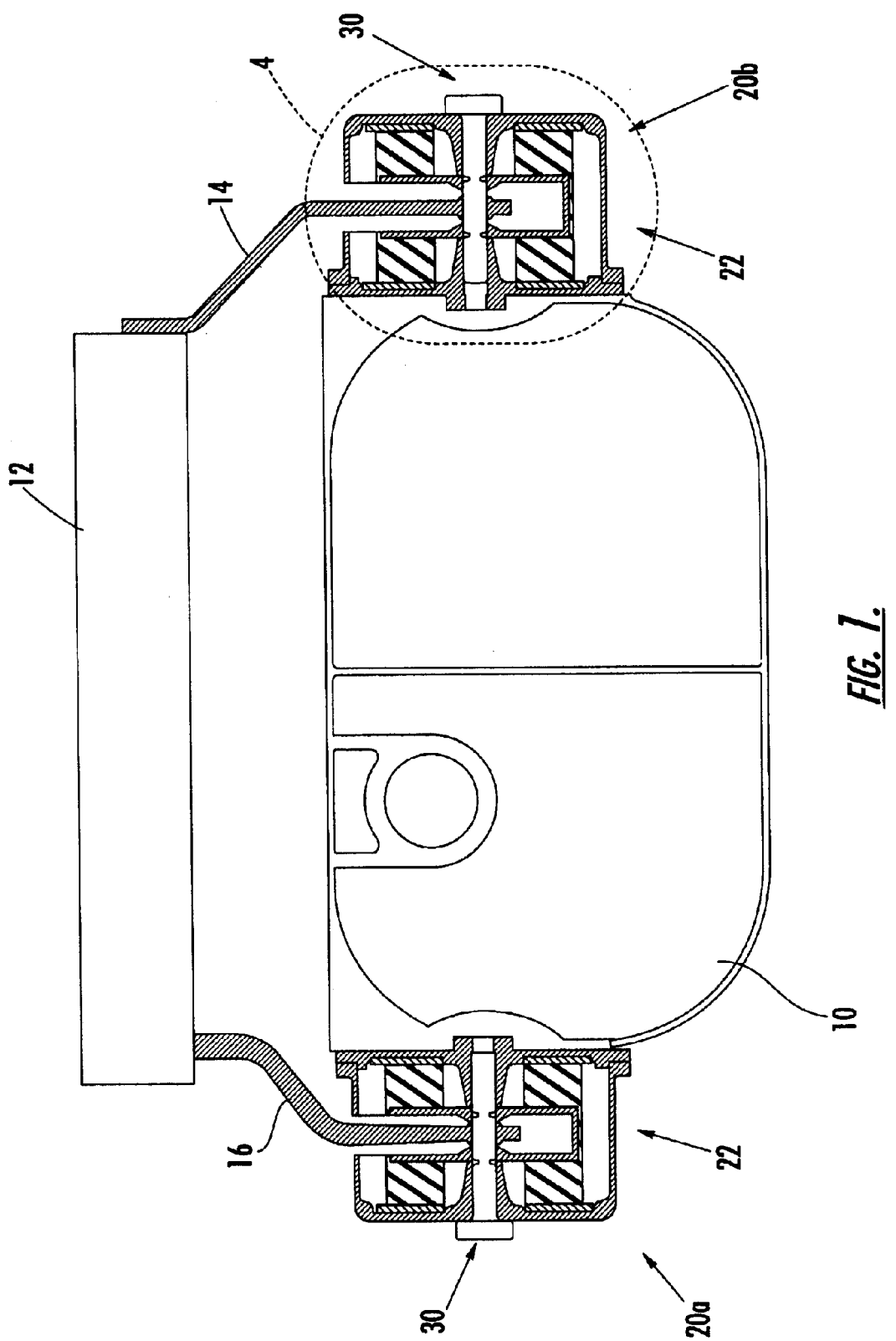
FIG. 1 is a schematic representation of an oil tank reservoir with vibration isolation devices of the present invention shown sectioned and made integral with the aft and forward facing portions of the reservoir.

Now turning to the drawing figures wherein like parts are referred to by the same numbers in the several views, FIG. 1 schematically illustrates a conventional oil tank reservoir 10 made integral with fan casing 12 by respective forward and aft directed bracket members 14 and 16. The bracket members are in turn made integral with aft and forward directed isolation devices 20a and 20b of the present invention. The isolation devices 20a and 20b are substantially the same so that as the description of the devices proceeds, for clarity isolation device 20b will be referenced however it should be understood that unless otherwise indicated, the elements comprising device 20b also comprise device 20a.

Figure 2:
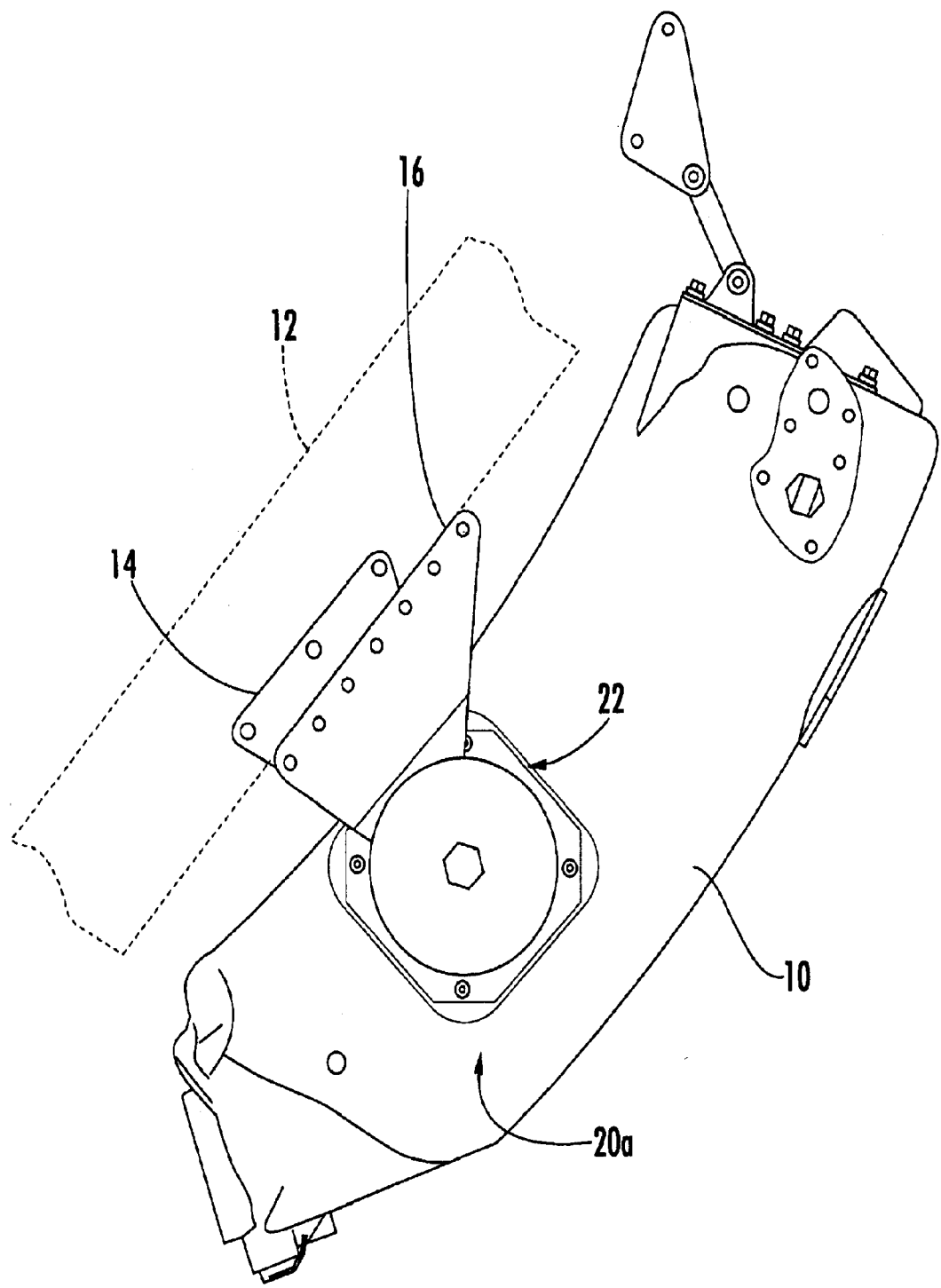
FIG. 2 is a side view of the oil tank reservoir of FIG. 1 illustrating the aft facing side of the reservoir.

Turning to FIGS. 1 and 2, the ends of the brackets 14 and 16 that are attached to the fan casing are attached to the casing by a conventional well known means such as by a rivet or bolt connection for example. A bracket (not shown) may also join the bracket ends to the exterior of the fan casing. The mount housing 22 and plate 32 are attached to the oil tank by a bolt or other suitable conventional attachment means. The head of the bolt or other attachment means sits on housing 22 when the mount is attached to the oil tank.

Figure 3:
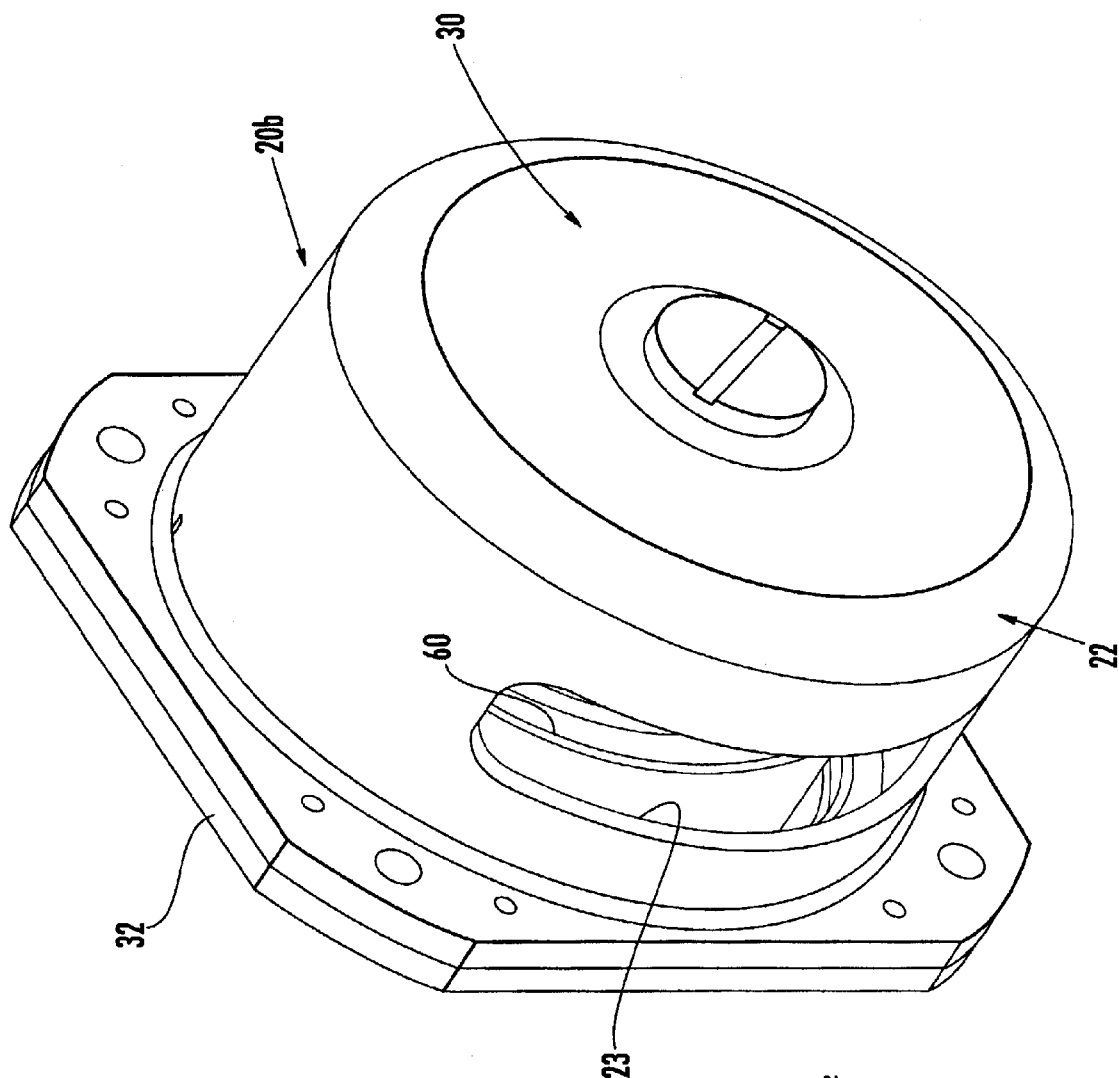
FIG. 3 is an isometric view of the isolation device of the present invention.
Figure 4:
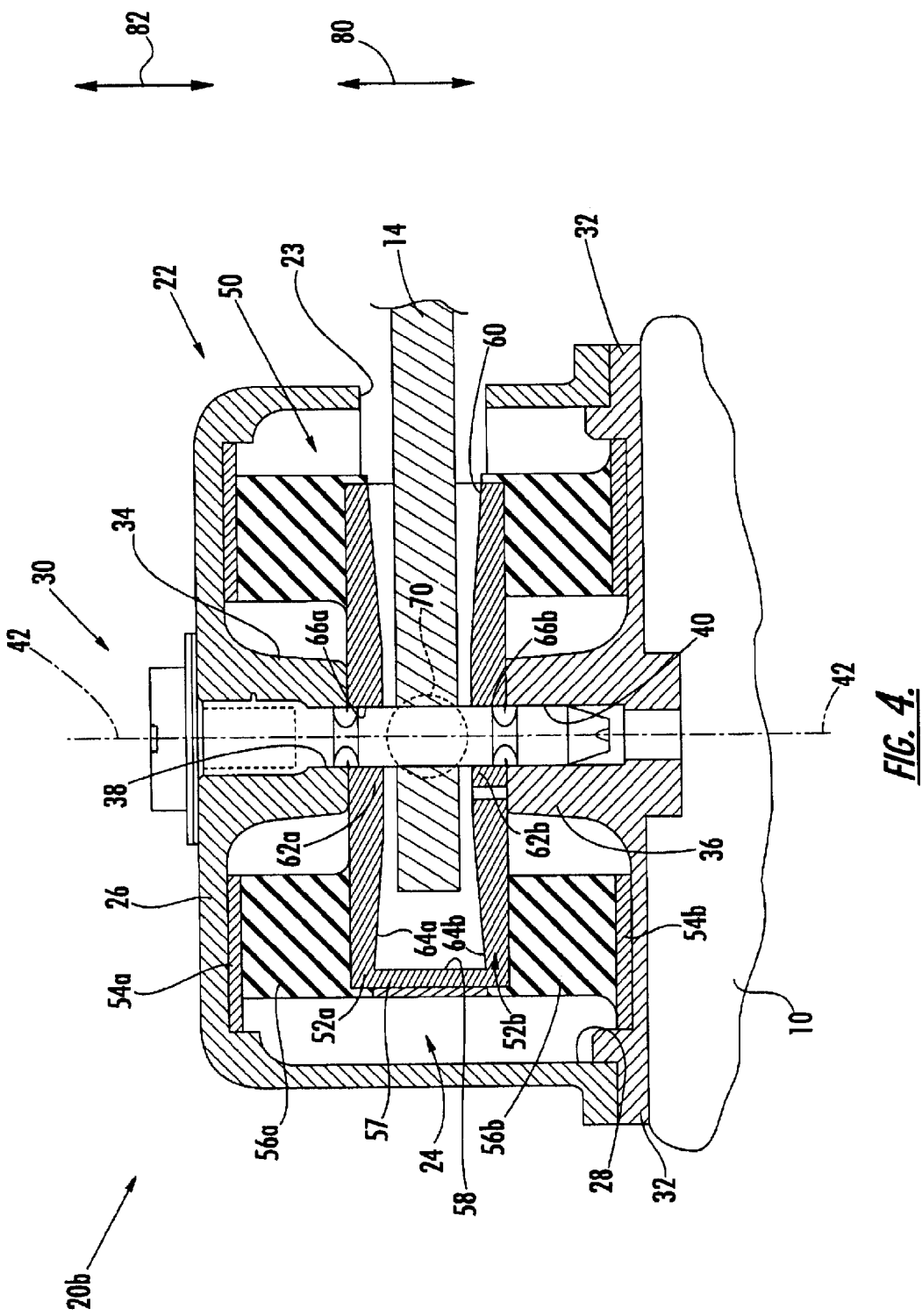
FIG. 4 is an enlarged view of the forward facing isolation device of FIG. 1 enclosed by the circle identified as 4 in FIG. 1 with the isolation device rotated counter clockwise ninety degrees for visual clarity.
Figure 5:
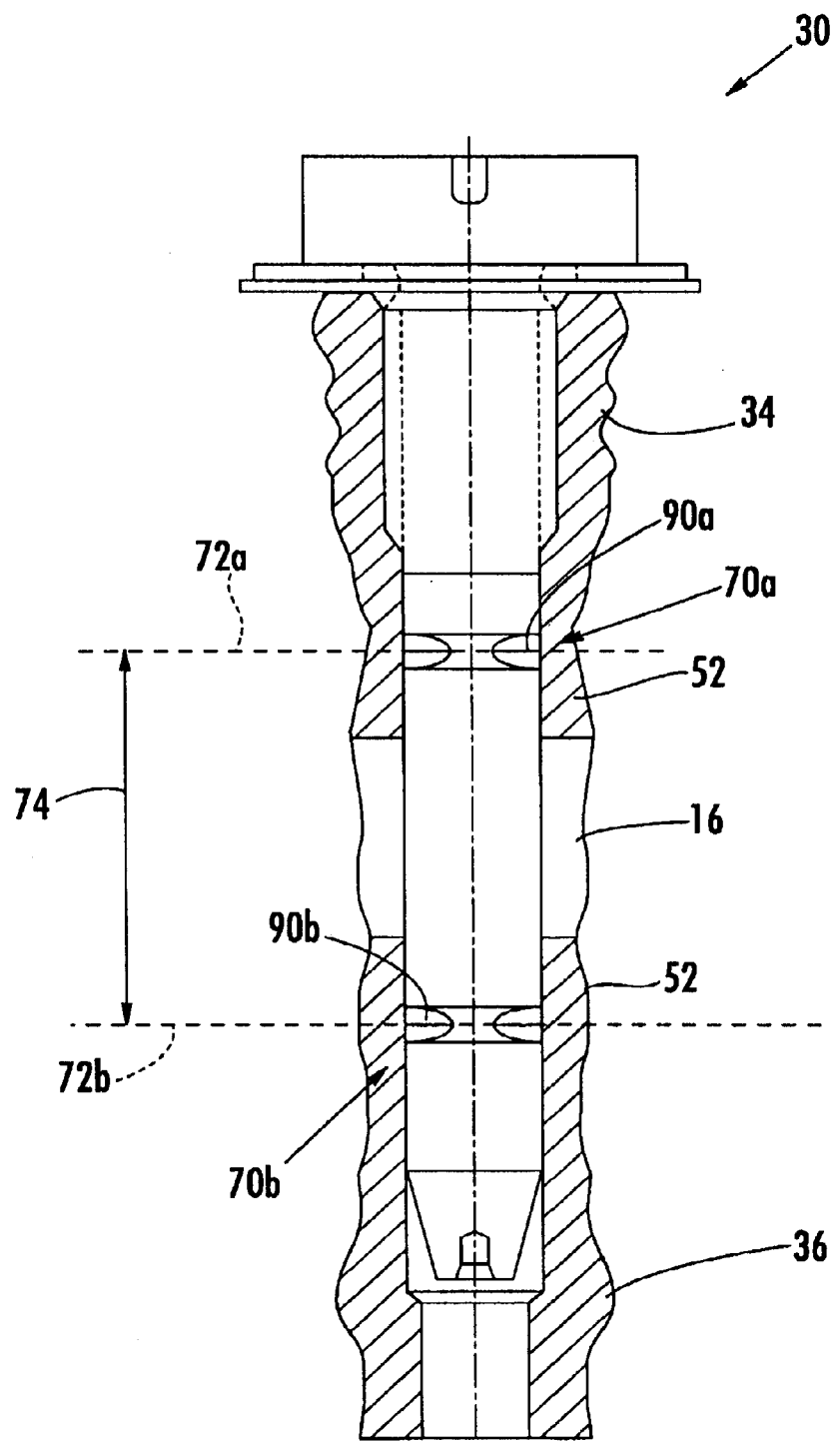
FIG. 5 is an enlarged view of the shear pin member shown in FIG. 4.

The isolation device of the present invention is shown in detail in FIGS. 3, 4 and 5. Generally, the device 20b acts as a rigid mount during typical fan casing vibration and displacement. When the vibration load or force applied to the device exceeds a predetermined threshold load, a fuse mechanism 30 is actuated causing the device to alter the stiffness of the device. After the fuse breaks, the effective spring rate of the device is reduced and the device becomes softer. As a result, the oil tank will experience lower loading with increased displacement. As will be described hereinbelow, the device 20b is designed to prevent the motion of the oil tank from exceeding a value that will over strain the external oil tank conduits and tubing. The attachment brackets 14 and 16 at all times provide axial stiffness and rigidity.

Now more specifically turning to FIGS. 3–5, the device 20b comprises housing 22 that defines housing chamber 24. As shown in FIGS. 1 and 4, one end of bracket 14 is inserted in housing chamber 24 through housing slot 23. A portion of bracket 16 is inserted into the housing chamber 24 of device 20a through a similar slot 23. The housing 22 has a closed end 26 and an open end 28 and the open end is closed by a discrete plate 32 that is joined to the closed housing end by conventional fastening means. Both the housing 22 and plate 32 are unitary and each includes a respective hub 34 and 36 located in the housing chamber 24 as shown in FIG. 4. Each hub substantially represents a frustum. The hubs each further comprise a bore 38 and 40 that extends completely through the hub. As shown in FIG. 4, as assembled, the hubs 34 and 36 and passageways 38 and 40 are axially aligned along axis 42. The free hub ends located in chamber 24 are substantially parallel separated by a distance.

Spring member 50 is located in the housing chamber 24 between the plate 32 and the closed housing end 26. The spring member comprises inner plate members 52a and 52b and outer shim stiffening members 54a and 54b that are joined by resilient members 56a and 56b. The resilient members are made from a fluorosilicone and the housing, shims and resilient members are made integral during a conventional molding process. The inner plate members 52a and 52b are substantially cylindrical and in combination define inner housing chamber 58. Plate 52b includes laterally extending side 57 that extends substantially along the entire periphery of plate 52b. Wall 57 defines slot 60 provided in the lateral wall and plate 52a sits on the free wall edge. The plates are separated by a wall a sufficient distance to ensure that slot 60 is adapted to receive bracket end as shown in FIG. 4 in chamber 58. The bracket end is located between the centrally located raised portions of the plates 52a and 52b. The raised portions of the plates are identified as 62a and 62b in FIG. 4. As shown in FIG. 4, the inner plate surfaces are 64a and 64b diverge radially outwardly toward the outer periphery of the housing.

A conventional spherical ball bearing 70 is rotatably supported by the bracket at the bracket end located in chamber 58. The ball is located between the raised portions and in aft mount 20a is in contact with and "pinched" between the plates. In forward directed mount 20b, the ball 70 is not in contact with the surfaces 62a and 62b during normal operating conditions. The combination of the spherical ball 70 and plates 52a and 52b permit the bracket to be displaced in a number of different planes and directions when fuse 30 is actuated. The bracket is only movable perpendicular to axis 42 before the fuse is broken.

The resilient members 56a and 56b are annular members. Tail portions of the members 56a and 56b are molded along the outer periphery of plates 52a and 52b respectively. As shown in FIG. 4, the axially oriented sides of the members are separated from the adjacent hub and housing by a distance. The distances between the resilient members, hubs and housing wall accommodate displacement of the resilient members as a result of shear and/or bulging. However the distances are limited so that displacement that might tend to overstrain the tubing or conduits flow connected to the oil tank are snubbed as the rubber contacts the housing wall or hub.

The shims 54a and 54b add stiffness to the resilient elements and are seated against the inner portions of the closed housing end 26 and the plate 32. After the spring unit 50 is manufactured the unit is located in the housing chamber and the plate 32 is attached to the open housing side. When the plate is attached to the housing the resilient members 56a and 56b are precompressed about ten percent (10%). Additionally, when the spring unit is located in the chamber, openings 66a and 66b provided in the housing are axially aligned with passages 38 and 40.

Fuse member is located along axis 42 through the axially aligned passages 38, 40 and openings 66a, 66b and is threadably connected to the passageway of hub 34. The fuse member is also inserted through the bracket end. The fuse member 30 is comprised of a shear pin with a length and shear locations 70a and 70b along the length of the member 30. The shear locations are comprised of annular grooves having semielliptical cross sections. The longitudinal center line of the grooves 70a and 70b represented by dashed lines 72a and 72b are axially aligned with the lines of contact formed between the mating surfaces between hubs 34, 36 and inner plate members 52a and 52bs. The lines of contact are identified at 90a and 90b. In this way, the shear forces applied to the mount and fuse member 30 will be substantially entirely applied to the shear section 74 of the pin length between the grooves 70a and 70b. In this way, when the predetermined threshold shear load is applied to the mount shear pin, the shear pin will fail.

The preferred shear pin comprises a large notch radius joining each groove 70a and 70b and the pin body for reducing stress concentrations at the shear locations. The relatively large notch radius allows for smooth blend transition from pin body to the grooves. The shear location grooves are ground and by the grinding operation the notch geometry produces fewer instances of surface stresses and surface flaws than are encountered during a single point machining operation. The heat treat temperature for the shear pin is increased to 1150° F. to reduce ultimate strength properties. As a result a larger shear section is required to provide the required threshold load and also results in a larger area to carry the same fatigue load thereby reducing the notch stress due to fatigue loading. Double heat treat is applied to the shear pin to ensure that the material properties are consistent through the entire pin cross section. The pin shear sections are dimensionally inspected by a comparitor.

Operation of the mount of the present invention will now be described.

During typical loading, the isolator 20b acts as a hard mount and is rigid. During normal input loading, the loads applied to the pin are not of sufficient magnitude to break the fuse. Before the predetermined threshold shear load is applied to the pin, the loads are transferred from the fan case 12, into the engine bracket 14, into the fusing pin 30 and then into the metal housing 22. The loads are then transferred into the oil tank 10.

Once the predetermined threshold load is met, such as during a blade out condition, the loads are transmitted from the fan case to the pin and the force causes the pins of devices 20a and 20b to shear. The pins are sheared at the shear locations at grooves 70a and 70b. After shear the load path is changed from the previous path between the pin 30 and housing 22 to the new path from the sheared pin section to the inner plate members 52a and 52b, elastomer shear pads 56a and 56b, to the housing 22 and then to the tank 10. The elastomer members reduces the effective spring rate of device 20b and makes the device softer. Relative motion between the bracket 14 and device may be provided in clockwise and counterclockwise directions 80 and in axial directions 82. Accordingly motion in a three hundred and sixty degree plane may be provided. The bracket is movable in a variety of directions as a result of the spherical ball and plate combination.

While we have illustrated and described a preferred embodiment of our invention, it is understood that this is capable of modification and therefore we do not wish to be limited to the precise details set forth, but desire to avail ourselves of such changes and alterations as fall within the purview of the following claims.

We claim:

1. A vibration isolation device located between a first member and a second member, the isolation device having a first isolation device stiffness supplied when loads applied to the isolation device are below a predetermined threshold load, the isolation device further comprising a second isolation device stiffness supplied when the load applied to the isolation device is at least equal to the threshold load, the vibration isolation device further comprising a housing defining a chamber and further comprising a spring member located in the housing, the vibration isolation device further comprising a fuse for altering the mount stiffness to the second isolation device stiffness when the threshold load is applied to the device, the isolation device being movable relative to the first member in a plurality of directions after the fuse is actuated wherein the housing further comprises a closed end and an open end and a first hub located in the chamber at the open end, the device further comprising a plate located at the open end, the plate having a second hub.

2. A vibration isolation device located between a first member and a second member, the isolation device having a first isolation device stiffness supplied when loads applied to the isolation device are below a predetermined threshold load, the isolation device further comprising a second isolation device stiffness supplied when the load applied to the isolation device is at least equal to the threshold load, the vibration isolation device further comprising a housing defining a chamber and further comprising a spring member located in the housing, the vibration isolation device further comprising a fuse for altering the mount stiffness to the second isolation device stiffness when the threshold load is applied to the device, the isolation device being movable relative to the first member in a plurality of directions after the fuse is actuated wherein the spring member comprises a first plate member and a second plate member that define an inner chamber, a first shim member and a second shim member and a first resilient member joining the first shim and first plate and a second resilient member joining the second shim and second plate.

3. The vibration isolation device as claimed in claim 2 wherein the housing comprises an inner spherical ball to support an end of the first member and divergent outer surfaces.

4. A vibration isolation device located between a first member and a second member, the isolation device having a first isolation device stiffness supplied when loads applied to the isolation device are below a predetermined threshold load, the isolation device further comprising a second isolation device stiffness supplied when the load applied to the isolation device is at least equal to the threshold load, the vibration isolation device further comprising a housing defining a chamber and further comprising a spring member located in the housings, the vibration isolation device further comprising a fuse for altering the mount stiffness to the second isolation device stiffness when the threshold load is applied to the device, the isolation device being movable relative to the first member in a plurality of directions after the fuse is actuated wherein the housing further comprises a closed end and an open end and a first hub having a first hub surface located in the chamber at the open end, the device further comprising a plate located at the open end, the plate having a second hub with a second hub surface and wherein the spring member comprises a first plate and a second plate defining an inner housing chamber and outer surfaces in contact with the hub surfaces when the spring is located in the housing chamber the contacting surfaces defining a line of contact.

5. The vibration isolation device as claimed in claim 4 wherein the fuse comprises a first shear location and a second shear location each shear location having a center axis, the center axis of the first shear location being substantially aligned with the line of contact defined between the first hub surface and inner housing surface and the second shear location center axis being aligned with the line of contact defined between the second hub surface and the inner housing surface.

* * * * *